United States Patent [19]

English et al.

[11] Patent Number: 4,569,002
[45] Date of Patent: Feb. 4, 1986

[54] MOTOR VEHICLE LIGHTING SYSTEM

[75] Inventors: George J. English, Reading; Robert E. Lvein, South Hamilton, both of Mass.

[73] Assignee: GTE Products Corporation, Stamford, Conn.

[21] Appl. No.: 598,613

[22] Filed: Apr. 10, 1984

[51] Int. Cl.$^4$ .............................................. B60Q 1/04
[52] U.S. Cl. ...................... 362/80; 362/238; 362/240; 362/241; 362/308
[58] Field of Search ............... 362/80, 83, 237, 238, 362/240, 246, 267, 297, 307, 310, 367, 341, 308, 245, 244

[56] References Cited

U.S. PATENT DOCUMENTS

| | | | |
|---|---|---|---|
| 3,392,278 | 7/1968 | Hammerstein | 362/246 |
| 3,414,762 | 12/1968 | Wyzykowski | 362/80 |
| 4,186,709 | 2/1980 | Gosswiller | 362/241 |
| 4,262,229 | 4/1981 | Bienvenue et al. | 313/318 |
| 4,368,505 | 1/1983 | Tomforde | 362/367 |
| 4,459,644 | 7/1984 | Bailly | 362/80 |
| 4,475,148 | 10/1984 | Tomforde | 362/269 |

FOREIGN PATENT DOCUMENTS 2045416 10/1980 United Kingdom ................ 362/237

*Primary Examiner*—William A. Cuchlinski, Jr.
*Attorney, Agent, or Firm*—Lawrence R. Fraley

[57] ABSTRACT

A lighting system for a motor vehicle including a plurality of replaceable, sealed lighting modules and means for mounting the modules in the vehicle in a pair of spaced-apart linear, horizontally disposed arrays. Each array possesses a maximum height of only about two inches and a width greater than the array height. All of the modules are similar and each includes a reflector with a lighting capsule mounted therein. The front of the module is enclosed by means of a optically clear cover exclusive of lens elements. A lens means is separately mounted in front of each array of lighting modules for controlling the light emitted therefrom to in turn provide both high and low beam patterns for the vehicle. Each of the arrays comprises four similar modules, resulting in a system containing a total of eight such components.

12 Claims, 4 Drawing Figures

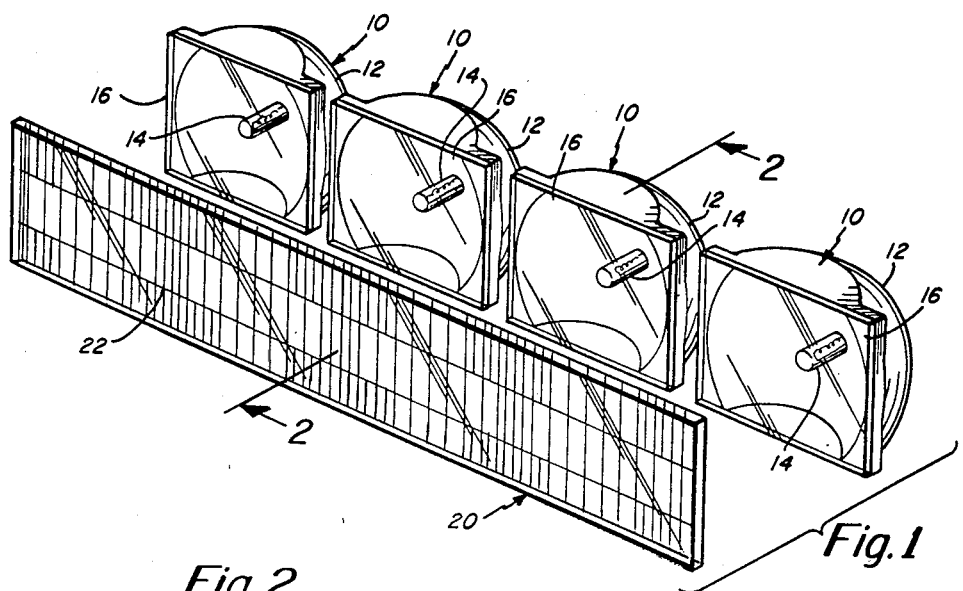
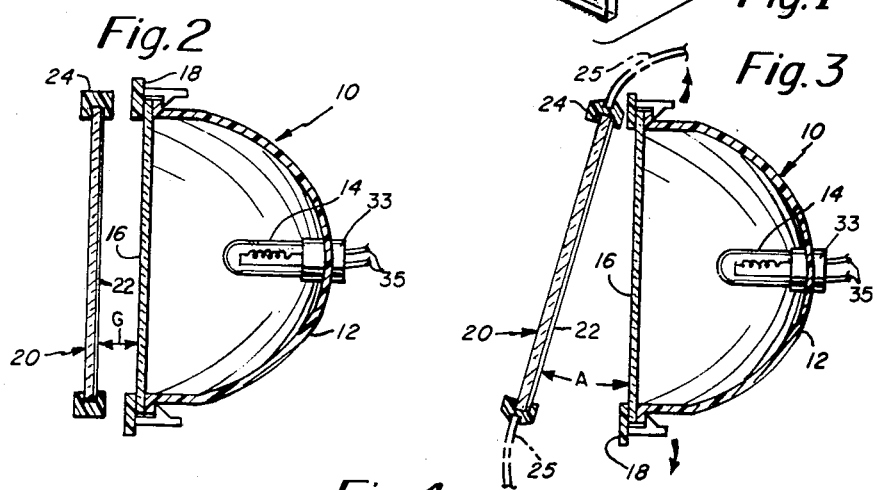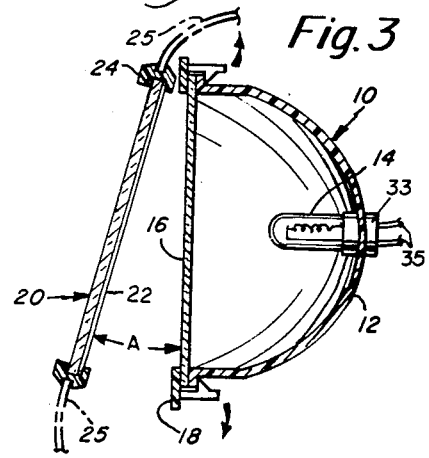
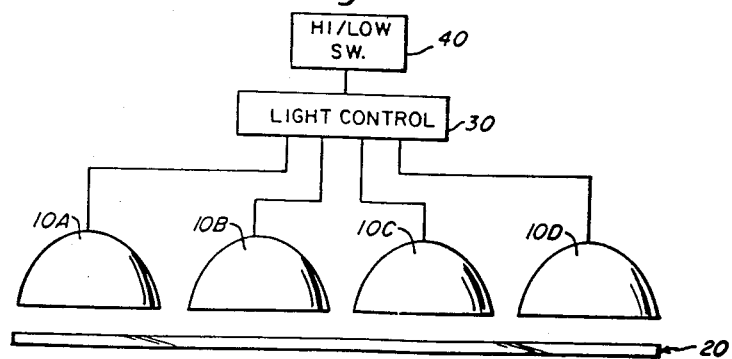

MOTOR VEHICLE LIGHTING SYSTEM

CROSS REFERENCE TO COPENDING APPLICATIONS

In Ser. No. 598,604, now U.S. Pat. No. 4,545,001, entitled "Sealed Lens Member For Use In A Motor Vehicle Lighting System" (Inventors: G. J. English et al), there is defined a hollow, single piece lens member for use in a motor vehicle lighting system containing a plurality of individual lighting modules.

In Ser. No. 598,614, entitled "Motor Vehicle Lighting System Including A Sealed Lens Member As Part Thereof" (Inventors: R. E. Levin et al), there is defined a motor vehicle lighting system including a light source and reflector means, a hollow, enclosed lens having a contoured front surface with a rear lensing surface, and a means for mounting the lens in a recess of said vehicle to assure adequate passage of light from the source through the lens.

In Ser. No. 598,605, entitled "Lamp-Reflector Module For Use In A Motor Vehicle Headlighting System" (Inventors: G. J. English et al), there is claimed the ornamental design for a lamp-reflector module for use in a motor vehicle lighting system.

In Ser. No. 598,606, entitled "Lens Member For A Motor Vehicle Headlighting System" (Inventors: G. J. English et al), there is claimed the ornamental design for a motor vehicle headlight lens member having a plurality of stepped lensing surfaces thereon and a slightly curved forward surface.

In Ser. No. 598,607, entitled "Lens Component For A Motor Vehicle Headlighting System" (Inventors: R. E. Levin, et al), there is claimed the ornamental design for a motor vehicle headlight lens having a sloped, clear front surface, a pair of side walls, a bottom wall, and a stepped, rear lensing portion to in turn define a sealed, single piece component.

In Ser. No. 598,615, entitled "Lighting Module For Motor Vehicle Lighting System" (Inventors: G. J. English et al), there is defined a lighting module for use as a part of a vehicle headlighting system wherein the module includes a reflector, a small tungsten halogen capsule sealed within the reflector, and a clear, front cover providing a seal for the module.

All of the above-identified applications were filed Apr. 10, 1984 and are assigned to the same assignee as the instant invention.

DESCRIPTION

1. Technical Field

The present invention relates in general to a new and improved lighting system for motor vehicles. More particularly, the present invention relates to a lighting system constructed to provide for improved aerodynamic performance of the motor vehicle.

2. Background

Existing lighting systems used in motor vehicles, and in particular those for providing forward illumination for automobiles, have generally not been designed with aerodynamic considerations in mind. As such, existing lighting systems have exhibited poor aerodynamic performance. It has been found in accordance with the instant invention that this poor performance can be improved by firstly reducing the vertical dimension of the individual headlamps and secondly by contouring the external surface of the lighting system in cooperation with the shape of the automobile's frontal surface.

The typical minimum height of headlamps found in existing lighting systems is no less than about four inches (some as high as seven inches), including systems having four rectangular headlamps (two per side) as part thereof. Of equal importance is the total area of the head lighting system when viewed from the front. In many existing systems, total vertical areas of about seventy to ninety square inches are common. Understandably, such large areas for lighting systems, must contribute to poor aerodynamic performance of the respective motor vehicles. In this regard, the following table is a list of present multiple headlamp lighting systems illustrating the approximate height and total frontal (vertical) area of each system listed.

TABLE

| System | Headlamp Type | Height (Inches) | Total System Area (Sq. Inches) |
|---|---|---|---|
| Sealed Beam Headlamps | | | |
| 2 Lamp, Round | 2D | 7 | 77 |
| 4 Lamp, Round | 1C/2C | 5¼ | 87 |
| 2 Lamp, Rectangular | 2B | 5½ | 83 |
| 4 Lamp, Rectangular | 1A/2A | 4 | 96 |
| Replaceable Capsule 2 Lamp, Rectangular | 2E | 4 | 48 |

Another disadvantage associated with existing lighting systems, particularly those of the sealed beam type, is the necessity to stock more than one type of headlamp. Specifically, one type of headlamp may be used to provide low beam while a separate, different type of headlamp is used to provide high beam. The vehicle owner, therefore, must maintain at least two different types to assure quick replacement due to headlamp failure.

In a more recently introduced system, referred to in the above Table as Type 2E, a lamp capsule element is replaced in a fixed reflector-lens combination (i.e., through a rear opening in the reflector). However, with this system, there exists the potential for a tolerance control problem, in particular between the positional arrangement of the lamp's filament and the reflector. With existing lighting systems, such as those mentioned above, there is also the problem that when a headlamp burns out, a major portion of the forward light pattern is lost due to the inability of only the single headlamp remaining (in a two headlamp arrangement) to provide sufficient forward illumination. In a four headlamp system (two per side) a significant reduction in output on one side of the vehicle occurs. Still another problem in existing systems with separate headlamps being used for high and low beam is the inherent lack of flexibility, particularly in optimizing both high and low beam patterns. In those systems in which two filaments are employed in a single lens-reflector combination, the lens element can typically be optimized for only one pattern. Switching to the second filament results in a compromised light distribution.

DISCLOSURE OF THE INVENTION

One object of the present invention is to provide an improved lighting system for use with a motor vehicle, and in particular, one adapted to improve the aerodynamic performance of the vehicle.

Another object of the present invention is to provide a new motor vehicle lighting system in which improved aerodynamic performance is obtained by a reduction of the vertical dimension of the individual light sources utilized so that the height of the optical system is, remarkably, only about two inches or less, which is less than about one-half of the minimum height of typical existing systems.

Another object of the present invention is to provide a new motor vehicle lighting system in which improved aerodynamic performance is achieved by virtue of the ability of the system's external contour to conform to the corresponding external shape of the automobile's front surface.

A further object of the present invention is to provide a motor vehicle lighting system in which there is a need for the vehicle's owner to stock only a single light source, which in accordance with the present invention is a capsule-reflector module, such that a singular source type satisfies the owner's replacement needs in the event of failure of any source in the system.

Still another object of the present invention is to provide a new motor vehicle lighting system in which the aforementioned capsule-reflector module has the advantage of superior tolerance control between the capsule's filament and reflector due to the ability to closely control base and socket tolerances at the time of manufacture of the module.

Another object of the present invention is to provide an improved motor vehicle lighting system which is characterized by improved optical performance, particularly upon failure of one of the system's light sources. In accordance with the instant invention, when a source burns out (fails), a major portion of the forward light pattern will remain, assuring sufficient forward illumination until replacement can be accomplished.

A further object of the present invention is to provide an improved motor vehicle lighting system which provides enhanced flexibility, particularly from an optical standpoint, by assuring optimal high and low beam content.

A further object of the present invention is to provide an improved motor vehicle lighting system which incorporates a plurality of individual capsule-reflector modules in combination with a high quality lensing system.

Still another object of the present invention is to provide an improved motor vehicle lighting system which is of relatively simple construction and in which the aforementioned modules can be safely and readily replaced even by a vehicle automobile owner with limited mechanical abilities.

In accordance with one aspect of the invention, there is provided a new lighting system for a motor vehicle, and in particular, an automobile. This lighting system comprises a plurality of replaceable sealed lighting modules, each of which comprises a reflector and a lighting capsule mounted in the reflector. The lighting capsule is preferably a low-wattage, tungsten halogen light source. Each of the modules also preferably includes a means for enclosing and sealing the module. This means may include an optically clear cover. This cover is preferably planar, of rectangular shape and is sealed at its perimeter to the reflector. Means are provided for mounting the plurality of lighting modules in the vehicle in a linear horizontal array, with the module array being constructed to provide improved aerodynamic performance in the vehicle. In this regard, the array preferably has a maximum height of about two inches and has a length greater than the array height. A lens means is provided and means are also provided for separately mounting the lens means in front of the array of lighting modules. The modules are readily replaceable should any one fail while the lens is preferably permanently mounted in position in the vehicle and in position to enhance the aerodynamics of the vehicle.

BRIEF DESCRIPTION OF THE DRAWINGS

FIG. 1 schematically illustrates the motor vehicle lighting system of the present invention wherein there is shown an array of reflector-capsule modules in combination with a lens member;

FIG. 2 is a cross-sectional view as taken along the line 2—2 in FIG. 1, illustrating the positional relationship between the reflector-capsule module and the lens member;

FIG. 3 is a cross-sectional view of an alternate embodiment of the invention, illustrating the lens member in a different position relative to the adjacent module; and FIG. 4 schematically represents the light control that may be provided in association with the motor vehicle lighting system of the invention.

BEST MODE FOR CARRYING OUT THE INVENTION

For a better understanding of the present invention, together with other and further objects, advantages and capabilities thereof, reference is made to the following disclosure and appended claims in connection with the above-described drawings.

With particular attention to the drawings, one embodiment of the present invention is illustrated in FIGS. 1 and 2. Specifically, FIG. 1 is an exploded perspective view and FIG. 2 is a cross-sectional view showing the proper positional arrangement of the invention's components. As illustrated in FIG. 1, the lighting system basically comprises a plurality of replaceable, sealed reflector-capsule lighting modules 10 and a common lens member 20 having a lens surface 22 for directing the light emitted by the modules and passing through the lens member in a forward direction and in accordance with a pre-established pattern. The various lens elements forming surface 22 are located internally (toward modules 10) to prevent dirt build-up thereon. The system is thus one for providing forward illumination for a motor vehicle when suitably positioned thereon (or within).

FIG. 2 illustrates one of the modules 10 of FIG. 1 in a cross-sectional view, said module comprising a reflector 12, a lighting capsule 14 mounted in the reflector, and a means for enclosing and sealing the module, illustrated in FIG. 2 as an optically clear planar cover 16. The cover 16 is hermetically sealed at its entire perimeter to the reflector 12 (e.g., by means of an appropriate adhesive). FIG. 2 also shows a means 24, which may be in the form of a support bracket, for retaining the lens member 20 in proper position within the motor vehicle (not shown). FIG. 2 also illustrates means 18 for supporting the module 10 within the vehicle. The module 10 is preferably supported in an easily releasable mounting arrangement to thus facilitate replacement. The module 10, for example, may be withdrawn by lifting the hood of the vehicle and removing the module from its supporting bracket and then replacing the module with a substantially identical one. All modules 10 are similar and substitution is thus possible for any one of the four (eight in the total system) using a common replacement module.

As indicated previously, the height of the optical system illustrated in FIGS. 1 and 2 is only about two inches or less. This contrasts with the minimum height of existing systems which is typically at least four inches or more. The total width of the instant system, regardless of how the width is divided across the front of the automobile, is preferably twenty inches or less, resulting in a maximum area of only about forty square inches for the optical system of the vehicle. In the preferred embodiment, there are two separate optical systems, one on either side of the vehicle, each having the aforedefined height of two inches and a width (or length) of ten inches. This total system area of only about forty square inches is substantially less than the area of present multiple headlamp systems, such as those defined in the table above. This minimal size thus provides an added advantage in both styling and aerodynamics. It is thus understood from the foregoing explanation that a total of eight individual modules 10 are employed per vehicle, with two sets of four each being strategically located on the vehicle (e.g., on or within opposed front fenders or as part of the grillwork). Should one module fail, therefore, total light output will not be significantly diminished.

FIG. 3 is a cross-sectional view similar to the view of FIG. 2, but showing the lens 20 in a different positional arrangement relative to the adjacent module 10. In FIG. 3, the same reference characters are thus used to identify the same parts. Therefore, in FIG. 3 there is shown the module 10 with its reflector 12 and lighting capsule 14. There is also shown the planar lens 20 which is disposed at an angle (A) which is preferably within the range of from about zero degrees (vertical) to about thirty degrees from vertical. The ability to slightly tilt the lens is deemed highly advantageous from an aerodynamic standpoint to enable the external surface of the lens to conform (match) the contour of the vehicle, said contour indicated by the dashed line (25) in FIG. 3.

As indicated previously, the main light source for each of the light-emitting modules 10 is a low wattage, tungsten halogen capsule 14 which is integrally mounted in a precision reflector 12. By low wattage is meant a wattage within the range of only about ten to about twenty-five watts. The capsule-reflector module 10 serves as a common light source that may be used with various lenses and lens combinations to produce any desired automotive lighting function. The external lens surface, such as illustrated in FIG. 3, is contoured to the individual requirements of the automobile's frontal surface, or it may be a standard element suitable for use on a variety of vehicles. Because the ultimate light distribution is determined by the specific lens prescription, the standard lamp-reflector module can uniquely be used with either high or low beam patterns or even for special functions such as auxiliary driving lights, fog lights, etc.

Accordingly, a significant advantage to the system of the present invention is that a single light source type (capsule-reflector module) can be stocked to fill the replacement needs for a large variety of headlighting types. This is a key advantage over many prior sealed beam systems (e.g., four-lamp systems) in which different lamps must be stocked, such as one for high beam and one for low beam.

Mention has also been made previously of the 2E twin (two) lamp system in which a lamp capsule member can be replaced (removed from the reflector) in a fixed reflector-lens combination. However, in comparison to this system, the present invention has the advantage of superior tolerance control between the filament and reflector because the replaceable module has an inherently larger tolerance due to base and socket tolerances. Such tolerances can understandably be closely controlled at the time of manufacture.

With particular regard once again to FIG. 1, it is noted that all of the modules 10 are substantially identical. The control of the beam pattern is thus accomplished by the lens member 10, which is designed to provide the various required optical distributions such as high and low beam patterns. In FIG. 1, a common (single element) lens member 20 is shown. However, an alternative embodiment may use separate, individual lenses which are spacedly positioned adjacent each module and separated from each other by a divider, if desired.

It is noted in FIG. 2 that the mounting of the module relative to the lens member is such that there is some gap (G) therebetween. In accordance with one embodiment of the invention, there may be provided a reference surface molded on the rear of the lens member and against which the respective module would be positioned. In this way, for example, the module could be properly aligned relative to the lens at the desired spacing (gap). Significantly, alignment between the lens and the lamp-reflector module is superior (more precise) to that of a replaceable headlight (with reflector) due to the relatively large reference base surface that could be provided. It is of course understood that the several modules 10 and adjacent lens member 20 must be aligned together (e.g., mechanically) to assure optimum light emission through the lens. In addition, it is also considered important to provide some means of adjusting both lens and modules for proper alignment (e.g., in the event of vehicle tilting). Such a means could include a bubble level or the like as an integral part of lens member 20 to clearly indicate correct alignment (relative to vertical). Similar aligning means can be provided as an integral part of each capsule or as part of a common clamp-holder designed to accommodate all four modules in one assembly. Uniquely, alignment of all four can thus be performed simultaneously, as can alignment of but a single lens member. Such a system should also include some means of indicating proper vehicle alignment to provide adequate comparison thereto prior to subsequent lens and/or module alignment.

Each of the modules 10 is mechanically sealed in a hermetic manner to prevent dirt and moisture from entering the critical optical region. This mechanical seal is provided by means of the clear, plastic or glass planar cover 16 which is sealed at its rectangular perimeter to the reflector, said cover not including any lensing elements as part thereof. Preferably, there is also some type of mechanical seal (not shown) provided between the lens 20 and the capsule-reflector module 10 to protect the rear lens surface. In addition, each of the low-wattage tungsten halogen capsules 14 which provide the light output for each module is hermetically sealed through the rear wall of the reflector component 12. This can be accomplished by providing two relatively small apertures (not shown) within the reflector's rear wall and inserting each of the capsule's two conductive, metallic lead-in wires (or supporting wires secured thereto, if desired) within a respective one of these apertures. Thereafter, ultrasonic welding can be employed to hermetically seal the plastic reflector material about each wire. The material for reflector 12 is plastic, preferably a polycarbonate (i.e., a plastic sold under the trademark Lexan by the General Electric Company). Another plastic suitable for the reflector is a mineral-filled nylon. The clear cover 16, which as indicated does not include any lensing elements on either side (or as part thereof), if plastic, is preferably the aforementioned Lexan polycarbonate. Sealing of the tungsten halogen capsule in the reflector is also possible by providing an insulative (e.g., plastic) base (or socket) 33 and hermetically sealing (e.g., also by ultrasonic welding) the lead-in wires therein. This base 33 can then be sealed (e.g., using a suitable epoxy) within the rear of the plastic reflector after placing the base within a suitable opening provided therein. Such an arrangement is depicted in FIGS. 2 and 3. The pair of conductors 35 projecting from the base are adapted for being electrically connected to the vehicle's power source.

One significant feature of each reflector as utilized per module is that almost all of the contour of the reflector's internal reflecting surface is maintained. Specifically, this is very little "cut-off" of this contour (preferably parabolic) at the upper and lower portions of the reflector. Thus, maximum reflecting efficiency is achieved, unlike many rectangular headlamp reflectors wherein extremely large parts of the contour, both upper and lower, are removed to assure the four to six inch maximum height requirement.

The tungsten halogen capsule itself may be one known in the light art. Typically, this comprises a quartz glass envelope having a pinch (press) sealed end through which the filament's lead-in wires (e.g., nickel or molybdenum) pass. The filament, being of tungsten, is electrically connected within the capsule to each lead-in wire (or an extension thereof). The halogen cycle is known in the lighting art and further explanation is thus not deemed necessary. Examples of tungsten halogen lamps are shown in U.S. Pat. Nos. 4,126,810; 4,140,939; 4,262,229; and 4,296,351. The capsules of the instant invention, having only one filament therein, each include only two lead-in wires for being connected to the filament and for projecting externally of the envelope's press sealed end.

As stated, the use of multiple sources (four on each side of the automobile, as illustrated in FIG. 1) has several advantages over present state-of-the-art systems. First, with the use of multiple sources, there is some desired redundancy in that more than one section of the system provides illumination to the same region of space with nearly identical light distribution. Thus, should one module fail (burn out), a major portion of the forward light pattern will not be completely lost as is the case with most present headlamp systems (including both two and four lamp systems). In the instant invention, about one-half of the coverage for any given forward component remains upon the failure of a single module. Second, it is known that only certain parts of the reflector provide beam elements suitable for developing the high intensity gradients required for the sharp cut-off of the low beam pattern near the horizontal plane through the vehicle's light source (headlamp). A greater percentage of the net reflector area for developing high intensities near the horizontal with minimum glare in the upper left quadrant (toward oncoming drivers) is possible in this invention through the utilization of several, but more numerous, reflector elements. Finally, an increase in the number of individual lighting units or modules in turn increases the flexibility of optimizing both the high and low beams. This is possible by switching (activating) selected modules for either high or low beam while leaving other modules energized for both patterns. Present headlamp systems in which two filaments are activated in a single lens-reflector headlamp unit do not typically possess such flexibility. With these existing systems, the lens elements can be optimized for only one pattern and switching to a second filament produces at best a compromised light distribution.

With the use of relatively small reflectors (those having an overall vertical height of about two inches or less) and relatively low wattage light sources in the instant invention, it is more readily possible to produce high quality reflectors than in prior art systems. As stated above, the invention's high quality reflectors are preferably constructed of plastic (a desirable feature also from a cost standpoint). In addition, the plastic lens is a preferred component in accordance with the present invention as it eliminates the previous problems (e.g., manufacturing) encountered with glass lenses used on many sealed beam headlamps. The small reflector and lens members of the instant invention, on the other hand, can be formed with superior control of contour and surface quality and in an economical manner (e.g., injection molding). This permits improvement of the light pattern in the critical regions of the beam as compared to many present systems. In addition, use of multiple lighting modules as in accordance with the present invention eliminates the need for two filament light sources. Such sources in prior art headlamps have the disadvantages of being optimized for only one of two light patterns, high beam or low beam. Furthermore, light scattering and the blocking of light from one filament by the other, serves to degrade ultimate performance. The relative locations of such dual filaments in a single source is not arbitrarily controllable since one filament is located according to the principle design, and the second filament is located to approximate the second, required pattern. On the other hand, the single filament (per module) of the present invention is always optimally located relative to the module's reflecting surfaces.

With regard to the mounting of the invention's filament, it is preferred that this element be axially mounted (along the reflector's optical axis). This has been found to be the preferred mounting for at least two reasons. First, this arrangement maximizes utilization of the reflector region near the horizontal plane (e.g., that region known to provide optimum control of high intensity gradients). Second, the filament image reflected off from the envelope of the lamp capsule is directed back onto the filament. Since the reflected filament image from the capsule's envelope has a luminance of approximately ten percent of the filament itself, it can strongly contribute to stray or uncontrolled light if it is not blocked by the filament. The axial filament is a preferred form of construction to assure this. In on example of the invention, a single coil (C8) tungsten filament was used. The resulting capsule produced eighteen watts during operation.

With reference to the control of beam pattern for both high and low beam, reference is made to FIG. 4 which schematically illustrates the four modules of FIG. 1. These are identified in FIG. 4 as modules 10A, 10B, 10C, and 10D. Also illustrated is the lens member 20. It is noted that the connections to each of the modules are coupled from a light control box 30 which furthermore has an input from a high-low switch 40.

The light control box 30 may be of conventional design and the switch 40 is simply a two-position switch selecting either high beam or low beam. In a low beam position, the light control box 30 causes activation of only modules 10A and 10B. Alternatively, in the high beam position, switch 40 and the light control box 30 control the modules so as to provide for activation of all modules 10A, 10B, 10C, and 10D, simultaneously.

In summary, there is provided a forward (headlighting) illumination system for motor vehicles, and in particular for automobiles, that is, remarkably, only two inches high. The light source for this system is in the form of a plurality of lamp-reflector modules, each constructed as an integral, hermetically sealed unit spacedly located behind an associated lens member for controlling the forward lighting on the vehicle. The illumination system of the invention is constructed so that there are multiple sources (e.g., four) on each side of the automobile. These multiple sources are defined in an array of multiple modules providing a generally rectangular shape with the larger dimension being horizontal. The lamp-reflector module, as noted above, is sealed using a planar cover and is disposed behind the lens at a slight spacing therefrom. The planar cover is clear, exclusive of lensing elements. The lens is contoured to the frontal shape of the automobile for aerodynamic considerations. The lens may be a single lens member (per module) or as a member common to all modules on each side. The lens serves to refract light in such a manner that, for example, two modules may be used for providing low beam per side while the addition of two other modules produces a high beam.

While there have been shown and described what are at present considered the preferred embodiments of the invention, it will be obvious to those skilled in the art the various changes and modifications may be made therein without departing from the scope of the invention as defined by the appended claims.

What is claimed is:

1. A lighting system for providing forward illumination for a motor vehicle, said system comprising:
    first and second pluralities of replaceable, sealed lighting modules each including a reflector, a lighting capsule sealed within said reflector and mounted within said reflector in predetermined alignment therewith, and means for enclosing and sealing said module, said enclosing and sealing means including a clear cover member sealed to said reflector and not including lens elements thereon or as part thereof;
    means for mounting each of said pluralities of said modules within said motor vehicle such that each of said pluralities of modules occupies a substantially linear and horizontally disposed array having a total vertical height of about two inches or less and a total width greater than said height;
    a lens means associated with each of said arrays of modules and located a spaced distance therefrom for controlling the light emitted from each of said pluralities of said modules in said array to provide a predetermined forward pattern of light; and
    means for mounting each of said lens means within said motor vehicle forward of said array of said modules.

2. The lighting system according to claim 1 wherein the number of said modules in each of said first and second pluralities of said modules is four, thereby providing a total of eight light-producing modules in said system.

3. The light system according to claim 2 wherein said four modules in each of said arrays are oriented in a juxtaposition relationship relative to said lens means.

4. The lighting system according to claim 2 wherein each of said four modules in each of said pluralities of modules is similar.

5. The lighting system according to claim 4 wherein said clear cover member sealed to said reflector is substantially planar.

6. The lighting system according to claim 4 wherein said lighting capsule in each of said modules is a tungsten halogen capsule having a quartz envelope and a pair of conductive lead-in wires.

7. The lighting system according to claim 6 wherein said tungsten halogen capsule is of the low wattage variety.

8. The lighting system according to claim 4 wherein said lens means associated with each of said array of four modules is a singular member common to said four modules.

9. The lighting system according to claim 8 wherein each of said singular, common lens members includes a lens surface thereon positioned so as to substantially face said modules.

10. The lighting system according to claim 8 wherein each of said singular, common lens members is contoured to substantially match the forward contour of said motor vehicle.

11. The lighting system according to claim 4 wherein activation of two of said four modules in each of said pluralities provides low beam illumination for said motor vehicle and activation of all of said modules provides high beam illumination for said motor vehicle.

12. The lighting system according to claim 1 wherein each of said modules is mounted within said motor vehicle in an easily releasable manner.

* * * * *